United States Patent
Edge et al.

(10) Patent No.: US 8,848,653 B2
(45) Date of Patent: Sep. 30, 2014

(54) EXTENDED CAPABILITY TRANSFER BETWEEN A USER EQUIPMENT AND A WIRELESS NETWORK

(75) Inventors: Stephen W. Edge, Escondido, CA (US); Sven Fischer, Nuremberg (DE); Yongjin Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1960 days.

(21) Appl. No.: 11/688,775

(22) Filed: Mar. 20, 2007

(65) Prior Publication Data

US 2007/0224990 A1 Sep. 27, 2007

Related U.S. Application Data

(60) Provisional application No. 60/784,587, filed on Mar. 20, 2006.

(51) Int. Cl.
*H04W 4/00* (2009.01)
*H04W 8/24* (2009.01)

(52) U.S. Cl.
CPC ...................... *H04W 8/24* (2013.01)
USPC ............................ 370/331; 455/436; 455/437

(58) Field of Classification Search
CPC ............ H04W 36/00; H04W 36/0033; H04W 36/0038; H04W 80/04
USPC ........... 455/436, 437, 419; 370/331, 329, 328
See application file for complete search history.

(56) References Cited

U.S. PATENT DOCUMENTS

| | | | |
|---|---|---|---|
| 5,914,937 A | 6/1999 | Arnold | |
| 6,134,200 A | 10/2000 | Timmermans | |
| 6,771,964 B1 * | 8/2004 | Lahtinen et al. | ............... 455/437 |
| 6,968,190 B1 | 11/2005 | Suumaeki et al. | |
| 7,246,242 B1 | 7/2007 | Niemi et al. | |
| 8,072,933 B2 | 12/2011 | Marinescu et al. | |
| 8,102,823 B2 | 1/2012 | Purkayastha et al. | |
| 8,121,293 B2 | 2/2012 | Vialen et al. | |

(Continued)

FOREIGN PATENT DOCUMENTS

| | | |
|---|---|---|
| EP | 1475981 A1 | 11/2004 |
| JP | 2003506982 T | 2/2003 |

(Continued)

OTHER PUBLICATIONS

International Search Report, PCT/US/07/064455—International Search Authority—European Patent Office—Jul. 18, 2007.

*Primary Examiner* — Wayne Cai

(74) *Attorney, Agent, or Firm* — Thien T. Nguyen

(57) ABSTRACT

Techniques for transferring new capability information in an efficient and backward compatible manner are described. A user equipment (UE) may send a new compatibility indicator to a wireless network to indicate that the UE has new capability information to send. This new capability indicator may be implemented with a spare bit in an information element included in an initial message sent to the network. The network may request for the information or indicate that it can receive the information. The UE may then send the new capability information to the network upon receiving the request or the indication. Alternatively, the network may convey that it supports transfer of new capability information, e.g., via a broadcast message or a unicast message. The UE may then send new capability information at any time to the network, without having to send the new capability indicator.

35 Claims, 6 Drawing Sheets

(56) References Cited

U.S. PATENT DOCUMENTS

| | | |
|---|---|---|
| 8,401,004 B2 | 3/2013 | Song et al. |
| 8,638,769 B2 | 1/2014 | Purkayastha et al. |
| 2003/0217168 A1 | 11/2003 | Adachi et al. |
| 2006/0019647 A1* | 1/2006 | Muhonen et al. ............. 455/419 |
| 2007/0041343 A1* | 2/2007 | Barreto et al. ................ 370/329 |
| 2008/0165751 A1 | 7/2008 | Soininen et al. |
| 2008/0263210 A1 | 10/2008 | Song et al. |
| 2012/0208537 A1 | 8/2012 | Edge et al. |
| 2013/0208716 A1 | 8/2013 | Song et al. |
| 2013/0282873 A1 | 10/2013 | Payne et al. |

FOREIGN PATENT DOCUMENTS

| | | |
|---|---|---|
| JP | 2003289306 A | 10/2003 |
| JP | 2005505998 T | 2/2005 |
| RU | 2073913 | 2/1997 |
| WO | WO-0111911 A1 | 2/2001 |
| WO | WO-03032598 A1 | 4/2003 |

* cited by examiner

EXTENDED CAPABILITY TRANSFER BETWEEN A USER EQUIPMENT AND A WIRELESS NETWORK

The present application claims priority to co-pending provisional U.S. Patent Application Ser. No. 60/784,587, entitled "EXTENDED CAPABILITY TRANSFER IN A WIRELESS NETWORK," filed Mar. 20, 2006, assigned to the assignee hereof and incorporated herein by reference.

BACKGROUND

I. Field

The present disclosure relates generally to communication, and more specifically to techniques for transferring capabilities between a user equipment (UE) and a wireless communication network.

II. Background

A UE (e.g., a cellular phone) may communicate with a wireless communication network in order to obtain various communication services such as voice, video, packet data, messaging, broadcast, etc. The UE may register with the network prior to obtaining any services. During registration, the UE may provide a list of its capabilities to the network, and the network may likewise provide a list of its capabilities to the UE. The UE and the network may also exchange capability lists when the UE accesses the network before or after registration, e.g., when the UE accesses a new base station. Each capability list may allow the recipient entity (the UE or network) to know which capabilities the sending entity supports and thus which capabilities and features may be invoked and used for various services.

The network may broadcast some or all of its capabilities. This may then allow the UE as well as other UEs to receive the network capabilities without having to exchange signaling with the network. The network may also send its capabilities in a point-to-point manner to the UE. In this case, the UE should be registered (or in the act of registering) with the network and may explicitly interact with the network to obtain the network capabilities.

The UE may send its capabilities to the network in a point-to-point manner before, during or following registration. The UE may also send its capabilities in other instances, such as when entering an active state with the network in order to invoke a service in the network (e.g., make an outgoing call), to respond to a paging request from the network for some service invoked by the network (e.g., receive an incoming call), etc.

The UE may send its capabilities in an information element (IE) to the network. The network may likewise send its capabilities in the same or different information element to the UE. An information element may be a parameter that may be included in a message and may be defined with specific fields of specific lengths. Different capabilities may be conveyed via different fields of the information element.

The UE and the network may transfer capability information using specific messages and information elements capable of conveying capabilities known at the time the messages and information elements are defined. However, new capabilities may be added as wireless technology evolves, as UE design improves, etc. The ability to include information on new capabilities using existing messages and information elements may be restricted, e.g., because the existing messages and information elements cannot be expanded to include new capability information. New messages and/or new information elements may be defined for conveying new capability information. However, these new messages and/or information elements may cause compatibility issues for UEs and networks that do not support these new messages and/or information elements. In addition, these new messages and/or information elements may have development impacts on network entities transporting them.

There is therefore a need in the art for techniques to transfer new capability information in a backward compatible manner and/or with little or no development impact.

SUMMARY

Techniques for transferring new capability information in an efficient and backward compatible manner are described herein. In an aspect, a UE may send a new capability indicator to a wireless network to indicate that the UE has new capability information to send and that the UE can send the information. This new capability indicator may be implemented with a spare bit in an information element included in a message sent by the UE to the network. The new capability information may comprise any information that is not transferable in the information element sent to the network. If the network supports transfer of new capability information and recognizes the new capability indicator, then the network may request for the information or indicate that it can receive the information. The UE may send the new capability information to the network upon receiving the request or the indication from the network.

In another aspect, the network may convey that it supports transfer of new capability information, e.g., via a broadcast message sent to all UEs or a unicast message sent to the UE. The UE may then send the new capability information at any time to the network, without having to send the new capability indicator.

Various aspects and features of the disclosure are described in further detail below.

DETAILED DESCRIPTION

The techniques described herein may be used for various wireless communication networks such as Global System for Mobile Communications (GSM) networks, Universal Mobile Telecommunication System (UMTS) networks, Code Division Multiple Access (CDMA) networks, wireless local area networks (WLANs), etc. The terms "network" and "system" are often used interchangeably. A GSM network utilizes GSM radio technology. A UMTS network may utilize Wideband-CDMA or some other radio technology. A CDMA network may utilize CDMA2000 1x, CDMA2000 1xEV-DO, or some other radio technology from cdma2000. A WLAN may utilize a radio technology from IEEE 802.11, Hiperlan, etc. W-CDMA and GSM are described in documents from an organization named "3rd Generation Partnership Project" (3GPP). cdma2000 is described in documents from an organization named "3rd Generation Partnership Project 2" (3GPP2). These documents are publicly available.

Figure 1:
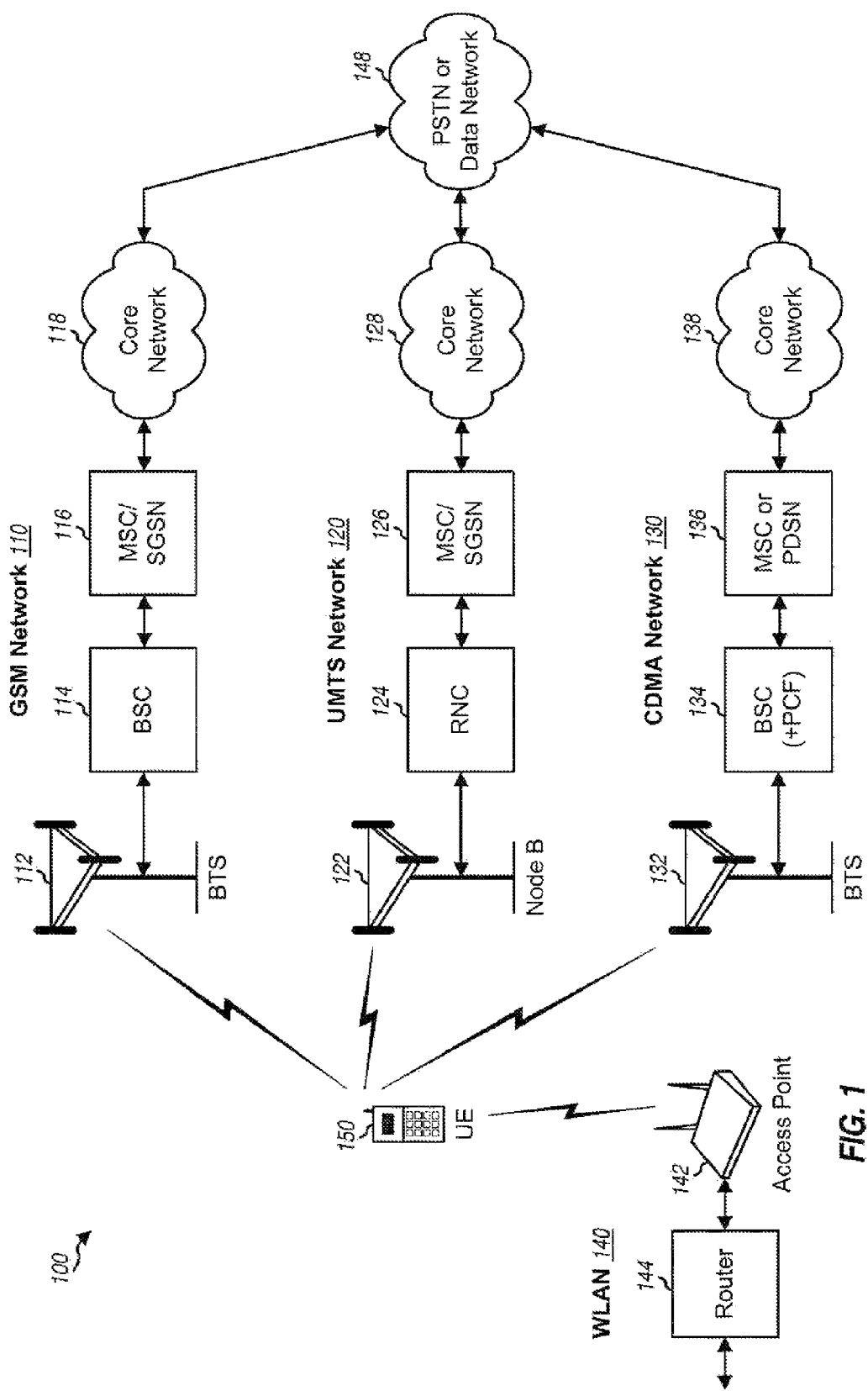
FIG. 1 shows a deployment that includes various wireless networks.

FIG. 1 shows a deployment 100 that includes a GSM network 110, a UMTS network 120, a CDMA network 130, and a WLAN 140. For simplicity, only one instance of some network entities is shown for each of networks 110, 120, 130 and 140.

GSM network 110 includes Base Transceiver Stations (BTSs) 112 that communicate with UEs within the coverage area of the GSM network. A Base Station Controller (BSC) 114 couples to BTSs 112 and provides coordination and control for these BTSs. A Mobile Switching Center/Serving GPRS Support Node (MSC/SGSN) 116 couples to BSC 114 and a core network 118 and performs various functions such as data routing. MSC 116 supports circuit-switched services for UEs communicating with GSM network 110. SGSN 116 supports General Packet Radio Service (GPRS) and provides packet-switched services for UEs communicating with GSM network 110. Core network 118 includes various entities that support various services for GSM network 110. Core network 118 may couple to a Public Switched Telephone Network (PSTN) and/or a data network (e.g., the Internet) 148.

UMTS network 120 includes Node Bs 122 that communicate with UEs within the coverage area of the UMTS network. A Radio Network Controller (RNC) 124 couples to Node Bs 122 and provides coordination and control for these Node Bs. An MSC/SGSN 126 couples to RNC 124 and a core network 128 and performs routing and other functions. Core network 128 supports various services for UMTS network 120 and may couple to PSTN or data network 148.

CDMA network 130 includes BTSs 132 that communicate with UEs within the coverage area of the CDMA network. A BSC and possibly a Packet Control Function (PCF) 134 couples to BTSs 132 and provides coordination and control for these BTSs. An MSC or a Packet Data Serving Node (PDSN) 136 couples to BSC (+PCF) 134 and a core network 138. BSC 134 and MSC 136 support circuit-switched services whereas PCF 134 and PDSN 136 support packet-switched services. PCF 134 is present for PDSN 136. Core network 138 supports various services for CDMA network 130 and may couple to PSTN or data network 148.

WLAN 140 includes access points 142 that communicate with UEs within the coverage area of the WLAN. A router 144 couples to access points 142 and routes data for these access points. Router 134 may also couple to other entities and/or networks. For example, router 134 may couple to a 3GPP WLAN network, which may include a WLAN Access Gateway (WAG) and a Packet Data Gateway (PDG). The 3GPP WLAN network may couple to a 3GPP core network, e.g., core network 118 or 128. Alternatively or additionally, router 134 may couple to a Packet Data Interworking Function (PDIF), which may couple to a 3GPP2 core network, e.g., core network 138.

A UE 150 may be capable of communicating with only GSM network 110, only UMTS network 120, only CDMA network 130, both GSM network 110 and UMTS network 120, or some other network or combination of networks. UE 150 may be stationary or mobile and may also be referred to as a mobile station, a terminal, a mobile equipment, a subscriber unit, a station, etc. The terms "UE", "mobile station", and "terminal" are synonymous and are used interchangeably herein. UE 150 may be a cellular phone, a personal digital assistant (PDA), a wireless communication device, a handheld device, a wireless modem, a laptop computer, etc. UE 150 may communicate with one or more base stations in a wireless network on the downlink and/or uplink at any given moment. The downlink (or forward link) refers to the communication link from the base stations to the UE, and the uplink (or reverse link) refers to the communication link from the UE to the base stations. A base station may correspond to a BTS, a Node B, an access point, etc.

The techniques described herein may be used for various wireless communication networks. For clarity, certain aspects of the techniques are described for GSM and UMTS networks.

The UE may send its capabilities to a wireless network (e.g., GSM network 110 or UMTS network 120) during registration with the network and possibly at other times. For example, the UE may send its capabilities in an information element for Mobile Station (MS) Classmark 1, 2 or 3 defined in 3GPP Release 6. MS Classmark 1 provides the network with information concerning aspects of high priority of the UE. MS Classmark 2 provides the network with information concerning aspects of both high and low priority of the UE. MS Classmark 3 provides the network with information concerning aspects of the UE. The information in MS Classmark 1, 2 or 3 may indicate general characteristics of the UE and may affect the manner in which the network handles the operation of the UE.

Figure 2A:
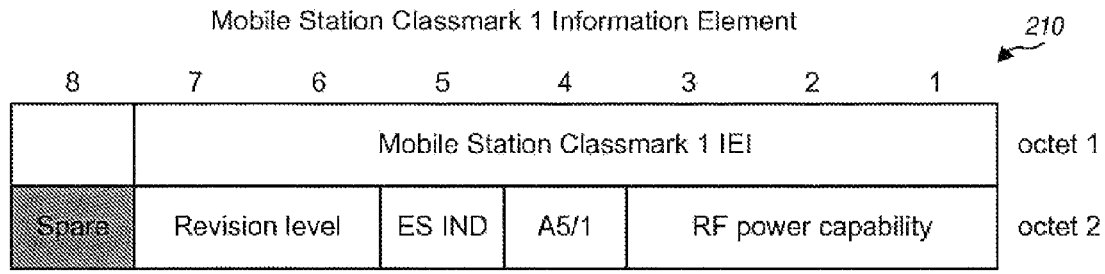
FIG. 2A shows an information element for Mobile Station (MS) Classmark 1.

FIG. 2A shows an MS Classmark 1 information element 210, which is two octets in length. Octet 1 includes an information element identifier (IEI) for MS Classmark 1. Octet 2 includes a revision level field, a controlled early classmark sending option (ES IND) field, an encryption algorithm A5/1 field, a radio frequency (RF) power capability field, and a spare bit (which is shown with shading in FIG. 2A and is always set to zero for 3GPP Release 6 and earlier 3GPP Releases). These fields are described in 3GPP TS 24.008, entitled "Mobile radio interface Layer 3 specification; Core network protocols; Stage 3," which is publicly available.

Figure 2B:
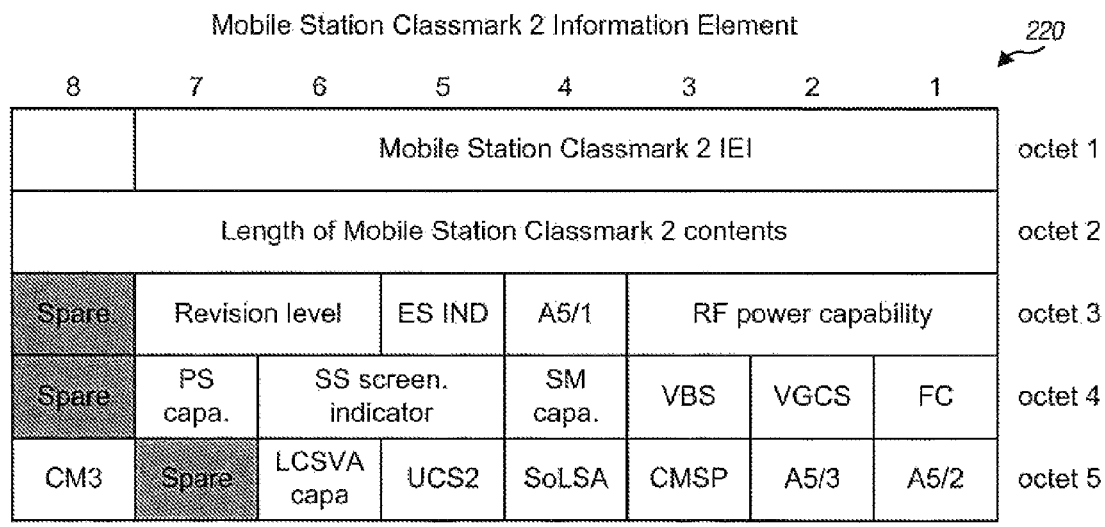
FIG. 2B shows an information element for MS Classmark 2.

FIG. 2B shows an MS Classmark 2 information element 220, which is five octets in length. Octet 1 includes an IEI for MS Classmark 2. Octet 2 includes the length of the MS Classmark 2 information element. Octet 3 includes all of the fields in octet 2 of the MS Classmark 1 information element. Octet 4 includes a pseudo-synchronization (PS) capability field, a supplementary service (SS) screening indicator field, a short message (SM) capability field, a voice broadcast service (VBS) notification reception field, a voice group call service (VGCS) notification reception field, a frequency capability (FC) field, and a spare bit set to zero. Octet 5 includes a classmark 3 (CM3) field, a location services (LCS) value added (VA) capability field, a Unicode (UCS2) field, a support of localized service areas (SoLSA) field, a connection management (CM) service prompt (CMSP) field, an A5/3 algorithm field, an encryption algorithm A5/2 field, and a spare bit set to zero. These fields are described in 3GPP TS 24.008.

Figure 2C:
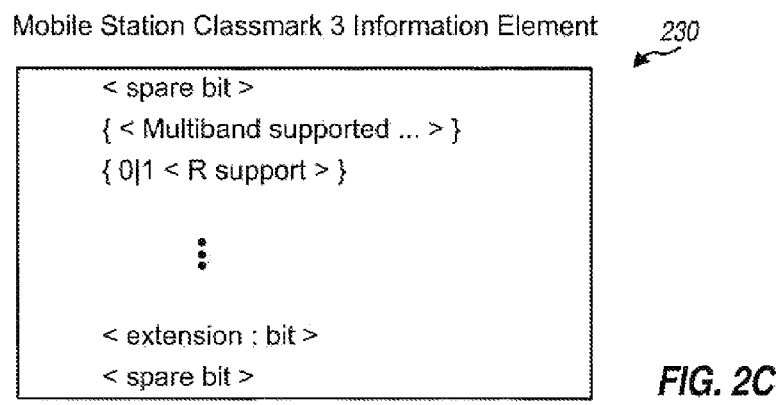
FIG. 2C shows an information element for MS Classmark 3.

FIG. 2C shows an MS Classmark 3 information element 230, which may be up to 14 octets in length. This information element includes a number of fields that are encoded in accordance with CSN.1 rules described in 3GPP TS 24.007, entitled "Mobile radio interface signalling layer 3; General aspects," Appendix B. Some fields are mandatory and have fixed format, some fields are optional and may be included by setting a bit, and some fields have flexible formats that may be indicated by one or more header bits. In 3GPP Release 6, the MS Classmark 3 information element includes a spare bit set to zero at the start and may include one or more spare bits set to zero at the end. Although not defined in 3GPP Release 6, an extension bit may be added to the MS Classmark 3 information element to indicate new capability information, as shown in FIG. 2C.

As shown in FIGS. 2A to 2C, the information elements for MS Classmarks 1, 2 and 3 may indicate various capabilities of the UE, such as the supported encryption algorithms, the RF power capability, the ability to be notified about a geographic location request for the UE, etc. The UE may send its capabilities in one or more classmark information elements in a CM Service Request message, a CM Re-establishment Request message, a Location Updating Request message, a Paging Response message, etc. The UE may send the CM Service Request message to request circuit-switched connection establishment, supplementary services activation, short message transfer, location services, etc. The UE may send the CM Re-establishment Request message to request re-establishment of a connection. The UE may send the Location Updating Request message to request update of its location file or to request IMSI attach. The UE may send the Paging Response message as a response to a Paging Request message. These messages are described in 3GPP TS 24.008 and in 3GPP TS 44.018, entitled "Mobile radio interface layer 3 specification; Radio Resource Control (RRC) protocol," both of which are publicly available.

The classmark information elements have fixed maximum lengths, and most of the bits in each classmark information element are currently used. In 3GPP Release 6, the MS Classmark 1 information element has a single spare bit, the MS Classmark 2 information element has three spare bits, and the MS Classmark 3 information element has some spare bits. The spare bits may be used to convey new capabilities of the UE. However, the limited number of spare bits and the limitation on the maximum size of the information element in the case of the MS Classmark 3 mean that only few capabilities may be conveyed directly with these spare bits.

A new information element may be defined to carry new/additional capability information. In the description herein, "new" capability information and "additional" capability information are synonymous and are used interchangeably. The new information element may be included in a message (e.g., a CM Service Request message) sent initially by the UE to the network. This would then allow the network to obtain the new capability information from the initial message sent by the UE. However, the size of the initial message may be limited due to constraints imposed during transport of the message from the UE to the network. The message size limitation for some messages carrying MS Classmark 1, 2 and 3 information elements is 20 octets in GSM, and some messages are already very close to this limit.

In an aspect, the UE may transfer new capability information to the network by first sending a new capability indicator to indicate that the UE has new capability information to send and that the UE can send the information. This new capability indicator may be implemented with any spare bit in any classmark information element and may be sent in an initial message to the network. If the network supports transfer of new capability information and recognizes the new capability indicator, then the network may request for the information or indicate that it can receive the information. The UE may then send the new capability information to the network upon receiving the request or the indication from the network.

Figure 3:
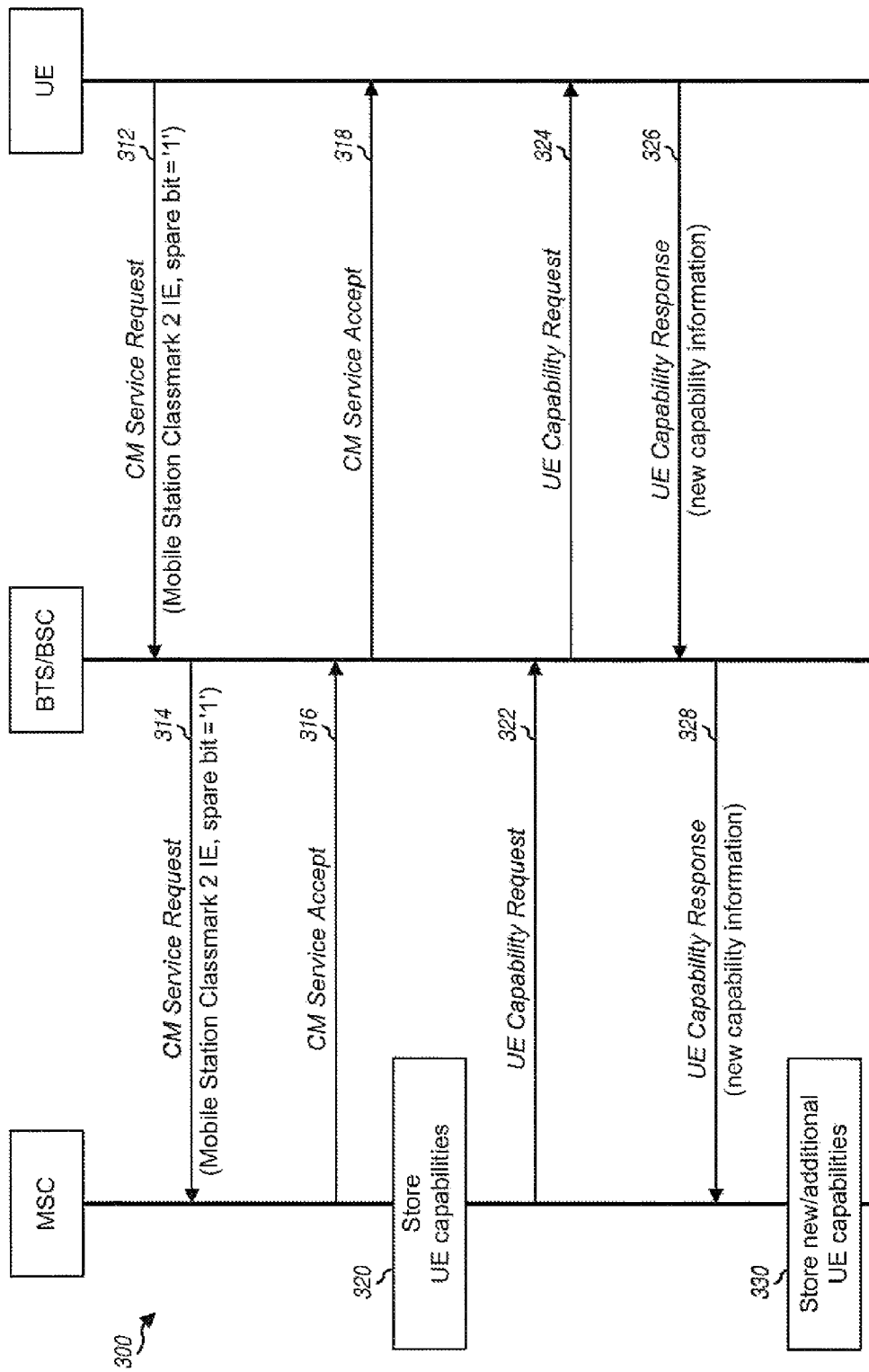
FIGS. 3 and 4 show message flows for two designs of transferring new capability information from a UE to a wireless network.

FIG. 3 shows a design of a message flow 300 for transferring new capability information from the UE to the network. The UE may send a CM Service Request message (or some other message) that may include an MS Classmark 2 information element (IE) (step 312). A spare bit in this classmark information element (e.g., bit 7 of octet 5 in FIG. 2B) may be set to binary one ('1') to indicate that the UE has new capability information to send. The binary one setting is different from the zero value that is used when the bit is spare. Hence, this binary one may be detected by any entity that has been programmed to look out for it and may be recognized as an indication of the UE ability to send more information. A BTS/BSC may receive this message from the UE and forward it to an MSC (step 314). The MSC may receive the message and respond with a CM Service Accept message (step 316), which may be forwarded by the BTS/BSC to the UE (step 318).

The MSC may store the UE capabilities included in the MS Classmark 2 information element received from the UE (step 320). If the MSC supports transfer of new capability information and desires to receive this information from the UE, then because the MSC has detected the UE ability to send this capability information, the MSC may send a UE Capability Request message (or some other message) to request for the information (step 322). The BTS/BSC may receive this message from the MSC and forward it to the UE (step 324).

The UE may receive the UE Capability Request message and recognize that the MSC supports and desires transfer of the new capability information. The UE may then send the new capability information in a UE Capability Response message (or some other message) (step 326). The BTS/BSC may receive this message from the UE and forward it to the MSC (step 328). The MSC may receive the UE Capability Response message and store the new capability information included in the message (step 330). The MSC may control the operation of the UE based on the UE capabilities received in the initial CM Service Request message and the new/additional UE capabilities received in the subsequent UE Capability Response message.

In general, the information in steps 322, 324, 326 and 328 may be sent in new messages not defined in the current 3GPP Release 6, new information elements in existing messages, or new contents for existing information elements in existing messages, etc.

In another design, the MSC receives the new capability indicator from the UE and sends an indication (instead of a separate message) that the MSC can receive the new capability information. This indication may be a flag or a designated bit that may be included in any message sent to the UE, e.g., the CM Service Accept message in step 316.

In the example shown in FIG. 3, messages are exchanged between the UE and the MSC via the BTS/BSC to transfer capability information from the UE to the MSC. In general, the UE may transfer capability information to any network entity designated to receive the capability information. The UE may send different capability information to different network entities. For example, the capability information in MS Classmarks 1, 2 and 3 may be sent to different network entities.

In the design described above, the UE initially sends the MS Classmark 2 information element with the new capability indicator to an MSC. The techniques may also be used for other classmark information elements.

In another design, the UE initially sends the MS Classmark 3 information element with the new capability indicator set to indicate that the UE has new/additional capability information that is not transferable in this information element. This new capability indicator may be implemented with the extension bit or some other new bit or new bit field in the MS Classmark 3 information element. The network may receive the new capability indicator and may send a request or an indication (e.g., in a Classmark Enquiry message) to request for the new capability information from the UE. The UE may thereafter send the new capability information to the network in a new information element included in a message, e.g., a Classmark Change message. As an alternative, the network may send a request or an indication (e.g., in a Classmark Enquiry message) to request for new capability information from the UE even if the MS Classmark 3 information element is not modified to support a new capability indicator from the UE. In this case, the UE may ignore the network request if the UE does not support the new capability information.

In the following description, a "legacy" UE is a UE that does not support transfer of new capability information using the techniques described herein, e.g., a UE that supports current 3GPP Release 6 or an earlier release of 3GPP specifications. A "legacy" network entity is a network entity that does not support transfer of new capability information, e.g., a network entity that supports current or earlier 3GPP release. A UE is assumed to support transfer of new capability information, and is thus a "new" UE, unless indicated as being a legacy UE. Similarly, a network entity is assumed to support transfer of new capability information, and is thus a "new" network entity, unless indicated as being a legacy network entity.

The new capability indicator may be implemented with any spare bit that is ignored by legacy network entities, e.g., legacy MSCs. This spare bit may be used to indicate the following:

1. The UE has new/additional capability information that is not transferable in a classmark information element, and
2. The UE has the ability to transfer the new/additional capability information.

This spare bit may be set to (i) a binary value of one ('1') to indicate that the UE has new capability information to send or (ii) a binary value of zero ('0') to indicate that the UE does not have any new capability information to send. The new network entities would be able to correctly interpret this spare bit.

The use of the spare bit to implement the new capability indicator is backward compatible with current and earlier 3GPP releases and does not adversely impact the operation of legacy network entities and legacy UEs. The legacy UEs may set this spare bit to zero ('0') in accordance with the GSM specifications. The legacy and new network entities will correctly interpret this spare bit and know that these legacy UEs do not have new capability information to send. The new network entities would not request for new capability information from the legacy UEs since this spare bit would not be set to one ('1'). The new UEs may set this spare bit to one ('1') whenever these UEs have new capability information to send. The legacy network entities would ignore the one setting of the spare bit, would not request these UEs to send their new capabilities, and would not receive messages carrying the new capabilities.

A new network entity (e.g., a new MSC) may detect a one ('1') for the spare bit used as the new capability indicator from a new UE. This network entity may send a new message (e.g., the UE Capability Request message in FIG. 3, a new Mobility Management (MM) message, etc.) or possibly an existing message (e.g., an existing MM message) to the UE. This message or an information element in this message may request the UE to send its new capability information. The UE may then respond with a new message (e.g., the UE Capability Response message in FIG. 3, a new MM message, etc.) or an existing message (e.g., an existing MM message). This message may contain one or more information elements carrying new capabilities supported by the UE.

In general, a network entity may send a request message (e.g., as shown in FIG. 3) or an indication to convey the following:

1. The network entity has received the new capability indicator from the UE, and
2. The network entity can and desires to receive the new/ additional capability information from the UE.

The UE may send the new capability indicator in any information element, such as those for MS Classmarks 1, 2 and 3, to the network. The new capability indicator allows the network to be aware immediately, upon receiving the information element, that the UE has new capability information to send. The network may then request this new capability information from the UE before invoking or using any service that may depend on the new UE capabilities.

A message containing the new capability indicator from the UE may carry additional information. Similarly, a message sent by the network to request new capability information from the UE may also carry additional information. For example, the request message from the network may include additional network capabilities, e.g., capabilities not defined in the current 3GPP release and not supported by legacy UEs. The message exchange may also be used to negotiate certain features and capabilities between the network and the UE. For example, the network may indicate features that it supports and that it would like the UE to support for the current session or service being invoked. The UE may indicate some or all of the features that it is willing to support.

In another aspect, the network conveys that it supports transfer of new capability information from the UE. The UE may then send new capability information at any time to the network, without having to send the new capability indicator.

Figure 4:
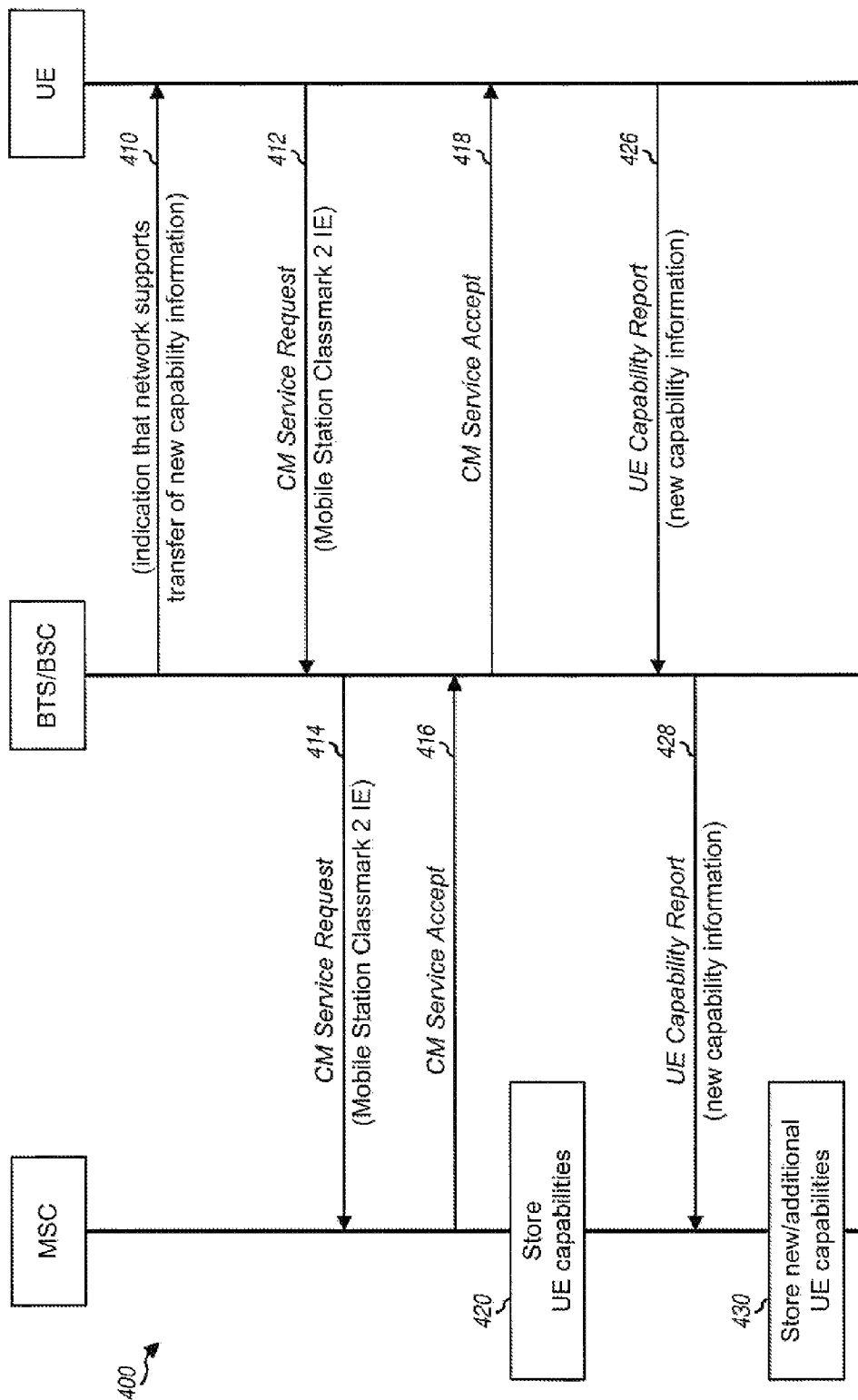

FIG. 4 shows a design of a message flow 400 for transferring new capability information from the UE to the network. The UE may receive an indication that the network supports transfer of new capability information (step 410). This indication may be a flag that is broadcast by the network, e.g., on a Broadcast Control Channel (BCCH) in GSM or in a System Information message in UMTS. This indication may also be conveyed via a unicast message, e.g., a Paging Request message, sent to the UE.

The UE may send a CM Service Request message (or some other message) that may include the MS Classmark 2 information element (step 412). Since the UE knows that the network supports transfer of new capability information, the UE does not need to send the new capability indicator. A BTS/BSC may receive the message from the UE and forward it to an MSC (step 414). The MSC may receive the message and respond with a CM Service Accept message (step 416), which may be forwarded by the BTS/BSC to the UE (step 418). The MSC may store the UE capabilities included in the classmark information element (step 420).

The UE may also send the new capability information in a UE Capability Report message (or some other message) (step 426). The BTS/BSC may receive this message from the UE and forward it to the MSC (step 428). The MSC may receive the UE Capability Report message and store the new capability information included in the message (step 430). The MSC may control the operation of the UE based on the UE capabilities received in the initial CM Service Request message and the new/additional UE capabilities received in the subsequent UE Capability message.

In yet another aspect, the UE may send new capability information in a new message or an existing message without sending the new capability indicator to inform the network and/or without receiving an indication that the network supports transfer of new capability information. The UE may simply assume that the network supports transfer of new capability information without receiving an explicit indication from the network. The message containing the new capability information may be sent in a manner to avoid or reduce the likelihood of problems with legacy network entities. For example, the new capability information may be included in an optional information element in an exiting message. A legacy network entity that does not support the optional information element may simply ignore it.

The UE may send new capability information to the network in accordance with the latest release supported by both the UE and the network. In 3GPP and 3GPP2, each new release is backward compatible with all prior releases and may include additional features and capabilities not supported by prior releases. For example, a new release may support new messages, new information elements, new parameter values, new protocols, new interfaces, etc. The UE and the network may validly exchange messages based on the latest release supported by both entities.

The UE may receive information on the release supported by the network, e.g., from a broadcast message sent by the network to all UEs or a unicast message sent directly to the UE. The UE may then determine the latest release supported by both entities. Alternatively, the UE may send the release supported by the UE to the network. The network may then determine the latest release supported by both entities. In any case, the UE may transfer capability information in accordance with the latest release supported by both entities. For example, the UE may transfer new capability information using the design shown in FIG. 3 or 4 for 3GPP Release 7 or using other message flows for other 3GPP release.

In general, new capability information may include any information that is not transferable in existing information elements, e.g., as defined in current 3GPP Release 6. Different new capability information may be associated with different classmark information elements. For example, the MS Classmark 1 information element may carry information intended for a base station, the MS Classmark 2 information element may carry information intended for the network (e.g., an MSC), and the MS Classmark 3 information element may carry information intended for the base station and/or network. New capability information intended for the base station may be sent in conjunction with the MS Classmark 1 or 3 information element. New capability information intended for the network may be sent in conjunction with the MS Classmark 2 or 3 information element.

New capability information sent in conjunction with the MS Classmark 2 information element may include any one or combination of the following:
  New location capabilities supported by the UE; and
  Extended support for privacy, e.g., ability of the UE to display more information regarding a client requesting the location of the UE.

New capability information sent in conjunction with the MS Classmark 1 or 3 information element may include the following:
  Positioning methods supported by the UE;
  Variants of positioning methods supported by the UE, e.g., UE-assisted, UE-based, conventional, and/or others;
  Specific measurement capabilities supported by the UE, such as carrier phase measurements, multi-frequency code or carrier measurements, fine time assistance measurements, and/or others; and
  Specific options for each positioning method supported by the UE, such as assistance data elements supported by the UE, or support for various optional elements within assistance data or other elements.

Various positioning methods based on the United States Global Positioning System (GPS), the European Galileo system, and the Russian GLONASS system may be supported by the UE. For example, the UE may support UE-assisted GPS, UE-based GPS, standalone GPS, UE-assisted Galileo, UE-based Galileo, standalone Galileo, UE-assisted GLONASS, UE-based GLONASS, standalone GLONASS, etc. Capability information may also convey enhancements (e.g., methods to provide long-term orbital data) to assisted-GPS, assisted-Galileo, and assisted-GLONASS positioning methods. The list of capabilities that the UE may convey to the network may be large and may change over time.

The UE may operate in GSM, GPRS, GERAN Iu, UMTS and/or other circuit and packet based modes, as defined by 3GPP. The UE may send new capability information to the network in different manners for different modes. Conveyance of new positioning capability information for different modes is described below.

For the GSM mode, the UE may send positioning capability information to a BSC in an MS Classmark 3 information element included in an RR Classmark Change message. The BSC may forward the information element inside a BSSMAP Classmark Update message to an MSC. When the MSC later requests the location of the UE, the MSC may include the MS Classmark 3 information element in a BSSMAP Perform Location Request message sent to the BSC. The BSC may then forward this information element in a BSSAP-LE Perform Location message to a Serving Mobile Location Center (SMLC) that supports positioning for the UE.

The UE may also include the MS Classmark 3 information element in messages supporting handover from the UMTS or GERAN Iu mode to the GSM mode. To enable handover from UMTS to GSM later, the UE may send the MS Classmark 3 information element to an RNC in an Inter-RAT UE Radio Access Capability information element included in an RRC Connection Setup Complete message. To enable handover from GERAN Iu mode to GSM later, the UE may send the MS Classmark 3 information element to a BSC in an MS GERAN A/Gb mode Radio Access Capability information element included in an RRC Connection Setup Complete message. The MS Classmark 3 information element may then be transferred in different handover related messages between the RNC and BSC when handover later occurs.

A spare bit in the MS Classmark 3 information element may be used as the new capability indicator or flag to indicate additional positioning capabilities. The new capability indicator may be conveyed to the RNC, BSC and MSC in a transparent manner. An existing 5-bit MS positioning method capability field in the MS Classmark 3 information element may be omitted in this case if the UE is aware that the network is a new network, which may help avoid exclusion of other information from this information element (which may be needed in order to comply with the 14 octets limitation for the MS Classmark 3 information element). An SMLC may receive the new capability indicator from the UE (e.g., when the BSC forwards the MS Classmark 3 information element to the SMLC as part of a location request) and may use 3GPP Radio Resource LCS Protocol (RRLP) signaling to request the new capability information from the UE in a manner that is transparent to the BSC, SGSN and MSC. The SMLC may send to the UE a new RRLP message or an existing RRLP message (e.g., an RRLP Measure Position Request message or an RRLP Assistance Data message) with a request for all of the UE positioning capabilities. The UE may then return its positioning capabilities in another new RRLP message or an existing RRLP message (e.g. an RRLP Measure Position Response message). The returned capability information may include existing capabilities if these were excluded earlier from the MS Classmark 3 information element. A pair of new messages (e.g., the SMLC request and UE response) may be added and/or the request/response may be carried within new information element in existing RRLP messages. The transfer of the new capability indicator or flag from the UE to the SMLC via one or more other entities (e.g., the BSC) and the subsequent transfer of the new capability information from the UE to the SMLC using new or existing RRLP messages need not be visible to other entities (e.g., the BSC or MSC) and thus may not have any new development impacts to them. In addition, the SMLC may convey to the UE in the RRLP Request message its own positioning capability information and Quality of Service (QoS) information for the impending position request, and the UE may indicate to the SMLC in the RRLP Response message any needed positioning assistance data in addition to its positioning capabilities.

Alternatively, the UE may convey its existing and new positioning capabilities to the BSC and RNC using new information elements and possibly new messages. For example, an existing Classmark Enquiry Mask information element included in a Classmark Enquiry message sent from the BSC to the UE to request the UE capabilities has two spare bits. One of these spare bits may be used to request a new Classmark Change message from the UE. If the UE supports the new message, then the UE may send new capability information in the new message to the BSC. When the UE location is requested, the BSC may send the new capability information to the SMLC either in an extension to an existing LCS Capability information element or a new information element included in a BSSAP-LE Perform Location message.

For the GPRS mode, the UE may send its positioning capabilities directly to an SGSN in a PS LCS Capability information element included in either a GPRS MM Attach Request message or a GPRS MM Routing Area Update Request message. When the SGSN needs to request the UE location, the SGSN may include the PS LCS Capability information element in a BSSGP Perform Location Request message sent to the BSC. The BSC may transfer this information element inside an LCS Capability information element included in a BSSAP-LE Perform Location Request sent to the SMLC. A spare bit in the PS LCS Capability information element may be used as the new capability indicator or flag to indicate additional positioning capability information for the UE. The UE may then transfer the new capability information to the SMLC directly and transparently to other network entities via an RRLP message exchange, as described above for the GSM mode.

For the GERAN Iu mode, the UE may send its positioning capabilities to a BSC in an MS Positioning Capability information element, which is part of a GERAN Iu Mode Radio Access Capability information element included in an RRC Connection Setup Complete message. When the UE location is needed, the BSC may transfer the UE positioning capabilities to the SMLC by mapping the capability flags to those supported in an LCS Capability information element included in a BSSAP-LE Perform Location Request message, e.g., in the same manner as for the GPRS mode. The UE may also send the MS Positioning Capability information element in an RRC Connection Setup Complete message to an RNC for UMTS access. The UE may also send this information element in a GERAN Iu Mode Classmark Change message to a BSC for GSM access and to support later handover to a BSC supporting GERAN Iu mode.

A spare bit in the MS Positioning Capability information element may be used as the new capability indicator or flag to indicate additional positioning capability information for the UE. The new capability indicator may be transferred to the SMLC, transparently to other network entities, to enable the SMLC to obtain the additional positioning capability information from the UE using an RRLP message exchange, e.g., as described for the GSM and GPRS modes.

Alternatively, a new information element may be added to the GERAN Iu Mode Radio Access Capability information element included in an RRC Connection Setup Complete message sent by the UE to the BSC during initial access and to other BSCs and RNCs during handover. The contents of the new information element may be conveyed to the SMLC in another new information element or in an extension of the existing LCS Capability information element included in a BSSAP-LE Perform Location Request message.

For the UMTS mode, the UE may send it positioning capabilities to an RNC in a UE Positioning Capability information element contained in a UE Radio Access Capability information element included in an RRC Connection Setup Complete message. When SAS-centric positioning is invoked, the RNC may transfer the UE positioning capabilities to the SAS in a UE Positioning Capability information element included in a PCAP Position Initiation Request message. The UE may also send its positioning capabilities to a BSC supporting GSM in a UE UTRAN Radio Access Capability information element included in a GSM UTRAN Classmark Change message. The UE may also send its positioning capabilities to a BSC supporting GERAN Iu mode in an RRC Connection Setup Complete message. In both cases, the BSC may thereafter transfer the UE positioning capabilities to an RNC in various handover-related messages.

The UE Positioning Capability information element does not have any spare bits for new positioning capabilities because non-extensible ASN.1 encoding is used for this information element. New positioning capabilities may be added to the RRC Connection Setup Complete message using a new parameter, e.g., an ASN.1 UE-RadioAccessCapability-v7xyext parameter defined for 3GPP Release 7. A new capability indicator or flag may be added (e.g., to the UE-RadioAccessCapability-v7xyext parameter) and may be conveyed first to the RNC, and then to the SAS if SAS-centric positioning is used. For SAS-centric positioning, the SAS may request additional capability information from the RNC, which may in turn request this information from the UE. For RNC-centric positioning, just the RNC may request additional capability information from the UE. Alternatively, the UE may convey its new positioning capabilities in a new information element to the RNC, which may then forward the information element to the SAS if needed.

The various messages for the GSM, GPRS, GERAN Iu, and UMTS modes are described TS 24.008, TS 44.018, and other 3GPP documents.

In the designs described above, the UE may receive an indication that the network supports transfer of new capability information prior to sending this information to the network. These designs may avoid a scenario in which the UE sends the new capability information to a legacy network that does not support transfer of new capability information, which may result in other problems.

For clarity, the techniques have been specifically described for transfer of new capability information that is not transferable in classmark information elements used in GSM and UMTS networks. The techniques may also be used to transfer capability information between UEs and other networks, e.g., CDMA networks, WLANs, local area networks (LANs), wireline data networks, the Internet, etc. The techniques may also be used to transfer any type of information from one entity to another entity in a communications network.

Figures 5, 6:
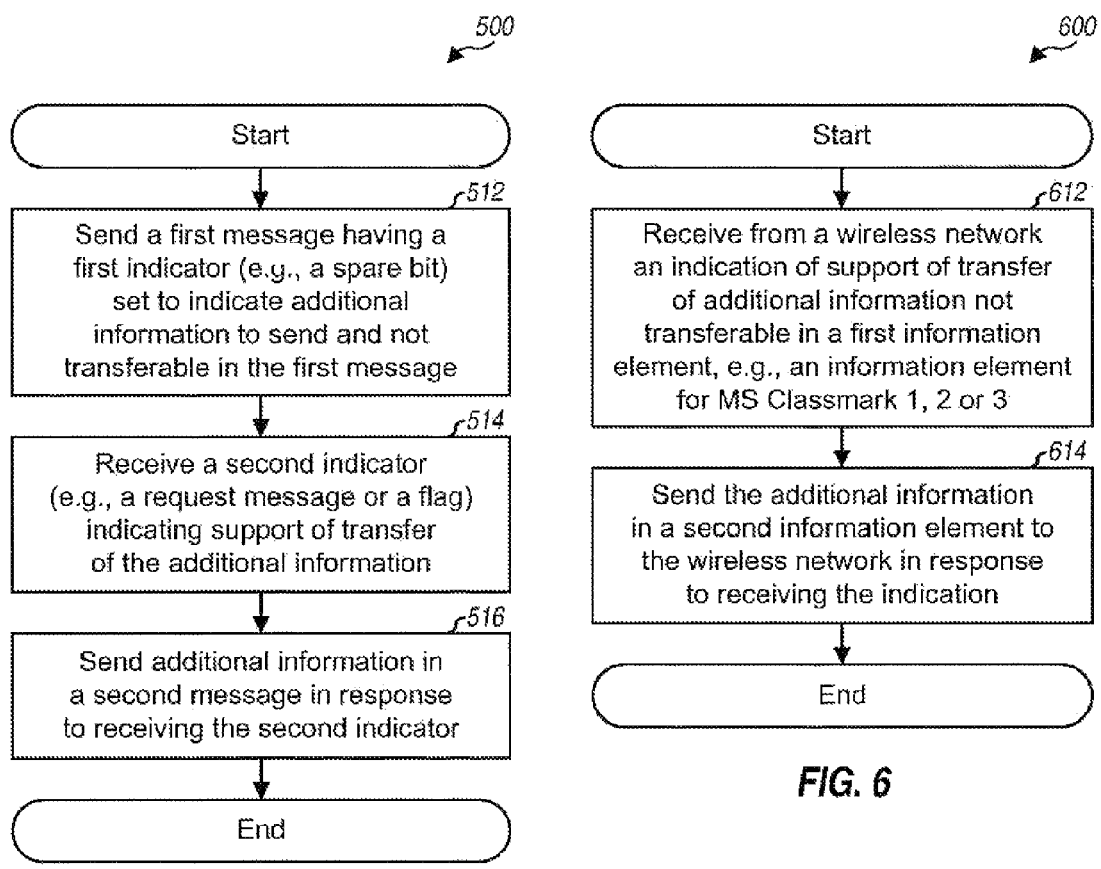
FIGS. 5 and 6 show two processes for transferring new capability information.

FIG. 5 shows a design of a process 500 for transferring new capability information. A first message having a first indicator set to indicate additional information to send and not transferable in the first message may be sent initially (block 512). A second indicator indicating support of transfer of the additional information may be received (block 514). The additional information may then be sent in a second message in response to receiving the second indicator (block 516).

Process 500 may be performed by a UE. In this case, the UE may send the first indicator in the first message to a wireless network and may receive the second indicator from the network. The first message may be a CM Service Request message, a CM Re-establishment Request message, a Location Updating Request message, a Paging Response message, a Classmark Change message, an Attach Request message, a Routing Area Update Request message, a Connection Setup Complete message, etc. The first indicator may be a spare bit in an information element included in the first message, e.g., an information element for Mobile Station Classmark 1, 2 or 3. The second indicator may be conveyed by a third message received from the network to request for the additional information, a flag indicating support of transfer of the additional information, etc. The additional information may comprise new capability information for location capabilities, positioning capabilities, notification capabilities, other capabilities for the UE, or a combination thereof.

Process 500 may also be performed by a network entity, e.g., to convey network capability information to the UE. The network entity may send the first message to the UE and may receive the second indicator from the UE. Process 500 may also be performed by one network entity to initiate transfer of new capability information from the UE to another network entity, as discussed above.

In general, the network may need to send capability and/or other information to the UE. Alternatively or additionally, the UE may need to send capability and/or other information to the network. Existing information elements and/or messages used to transfer the capability and/or other information may not be expandable to include new information. In this case, a currently unused or spare bit, a flag, a value, or some other indication in an information element or a message may be used as the first indicator to indicate that the sending entity (e.g., the UE or network) has additional information to send to the recipient entity. The recipient entity, if capable of recognizing this first indicator, may then send the second indicator back to the sending entity to request for transfer of the additional information. The second indicator may be sent in a new or existing information element included in a new or existing message. The sending entity may send the additional information in a new or existing information element included in a new or existing message.

FIG. 6 shows a design of a process 600 performed by a UE to transfer new capability information. The UE may receive from a wireless network an indication of support of transfer of additional information not transferable in a first information element, e.g., an information element for MS Classmark 1, 2 or 3 (block 612). The UE may receive this indication via a broadcast message, a unicast message, etc. The UE may then send the additional information in a second information element to the wireless network in response to receiving the indication (block 614). The UE may send a single message with the second information element to the wireless network. In this case, the second information element may include information normally conveyed in the first information element as well as the additional information. Alternatively, the UE may send a first message with the first information element and a second message with the second information element to the wireless network. In any case, the additional information may comprise new capability information for the UE and may cover any of the capabilities listed above.

Figure 7:
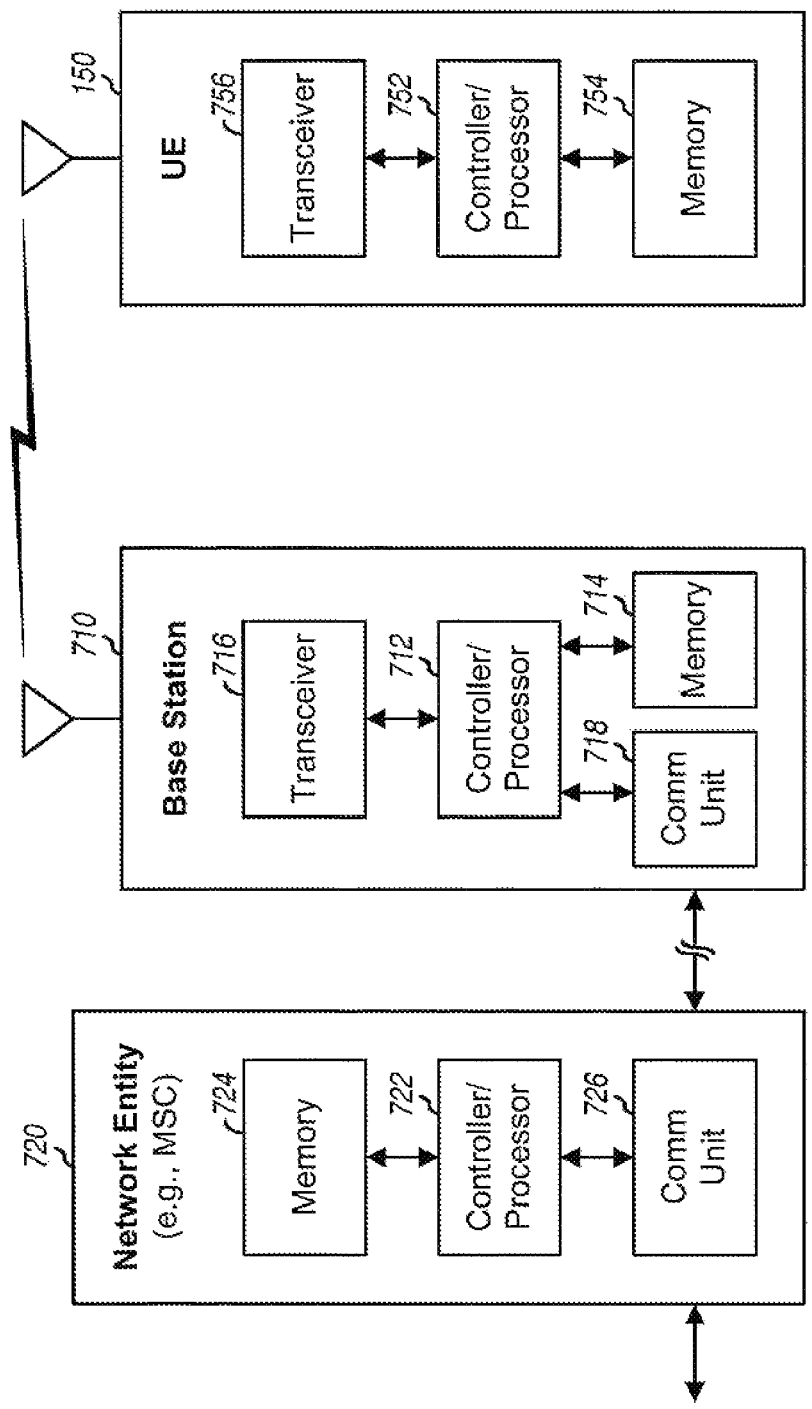
FIG. 7 shows a block diagram of a UE, a base station, and a network entity.

FIG. 7 shows a block diagram of UE 150, a base station 710, and a network entity 720. Base station 710 may correspond to a BTS/BSC, a Node B/RNC, an access point, etc. Network entity 720 may correspond to an MSC, an SGSN, a PDSN, a PDG, etc. For simplicity, FIG. 7 shows only one controller/processor 712, one memory 714, one transceiver 716, and one communication (Comm) unit for base station 710, only one controller/processor 722, one memory 724, and one communication unit 726 for network entity 720, and only one controller/processor 752, one memory 754, and one transceiver 756 for UE 150. In general, each entity may include any number of processors, controllers, memories, transceivers, communication units, etc. UE 150 may support communication with one or more wireless networks, e.g., GSM, UMTS, CDMA, WLAN, etc. UE 150 may also receive and process signals from one or more satellite positioning systems, e.g., GPS, Galileo, GLONASS, etc.

On the downlink, base station 710 transmits traffic data, signaling, and possibly pilot to UEs within its coverage area. These various types of data are processed by processor 712 and conditioned by transceiver 716 to generate a downlink signal, which is transmitted via an antenna. At UE 150, the downlink signals from one or more base stations are received via an antenna, conditioned by transceiver 756, and processed by processor 752 to obtain various types of information. Memories 714 and 754 store program codes and data for base station 710 and UE 150, respectively. Processor 752 may perform the actions for the UE in FIGS. 3 and 4 and may implement process 500 in FIG. 5, process 600 in FIG. 6, and/or other processes.

On the uplink, UE 150 may transmit traffic data, signaling, and possibly pilot to one or more base stations. These various types of data are processed by processor 752 and conditioned by transceiver 756 to generate an uplink signal, which is transmitted via the UE antenna. At base station 710, the uplink signals from UE 150 and other UEs are received and conditioned by transceiver 716 and further processed by processor 712 to obtain various types of information from the UEs. Base station 110 may communicate with network entity 720 via communication unit 718.

Within network entity 720, processor 722 performs processing for the techniques described above. For example, processor 722 may perform the actions associated with the MSC in FIGS. 3 and 4. Memory 724 stores program codes and data for network entity 720 and may also store UE capabilities. Communication unit 726 allows network entity 720 to communicate with base station 710 and/or other network entities.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 714, 724 or 754 in FIG. 7) and executed by a processor (e.g., processor 712, 722 or 752). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
a processor at a mobile station to initiate transmission of a first message having a first indicator set to indicate additional information to send and not transferable in the first message, receive a second indicator from a wireless network indicating support of transfer of the additional information, and initiate transmission of the additional information in a second message in response to receiving the second indicator, wherein the additional information initially informs the wireless network about one or more additional capabilities of the mobile station as operable with the wireless network;
and a memory coupled to the processor.

2. The apparatus of claim 1, wherein the first indicator is a spare bit in an information element included in the first message.

3. The apparatus of claim 1, wherein the first indicator is a spare bit in an information element for Mobile Station Classmark 1, 2 or 3 included in the first message.

4. The apparatus of claim 1, the processor to further receive a third message requesting for the additional information and serving as the second indicator.

5. The apparatus of claim 1, the processor to further receive a flag indicating support of transfer of the additional information and serving as the second indicator.

6. The apparatus of claim 1, wherein the first message is a CM Service Request message, a CM Re-establishment Request message, a Location Updating Request message, a Paging Response message, a Classmark Change message, an Attach Request message, a Routing Area Update Request message, or a Connection Setup Complete message.

7. The apparatus of claim 1, wherein the additional information comprises new capability information for a user equipment (UE).

8. The apparatus of claim 1, wherein the additional information comprises information for location capabilities, positioning capabilities, notification capabilities, or a combination thereof, for a user equipment (UE).

9. The apparatus of claim 1, wherein the first message is transmitted to a wireless network and the second indicator is received from the wireless network.

10. The apparatus of claim 1, wherein the first message is transmitted to a user equipment (UE) and the second indicator is received from the UE.

11. An apparatus comprising:
a processor at a mobile station to set a spare bit in a Mobile Station Classmark information element to indicate new capability information to send and not transferable in the information element, initiate transmission of the Mobile Station Classmark information element in a first message to a wireless network, receive an indication that the wireless network supports transfer of the new capability information, and initiate transmission of the new capability information in a second message to the wireless network in response to receiving the indication, wherein the new capability information initially informs the wireless network about one or more additional capabilities of the mobile station as operable with the wireless network; and a memory coupled to the processor.

12. A method comprising:
transmitting a first message from a mobile station having a first indicator set to indicate additional information to send and not transferable in the first message;
receiving a second indicator from a wireless network indicating support of transfer of the additional information; and
transmitting the additional information in a second message in response to receiving the second indicator, wherein the additional information initially informs the wireless network about one or more additional capabilities of the mobile station as operable with the wireless network.

13. The method of claim 12, wherein the receiving the second indicator comprises receiving a third message requesting for the additional information and serving as the second indicator.

14. The method of claim 12, wherein the first indicator is a spare bit in an information element for Mobile Station Classmark 1, 2 or 3 included in the first message.

15. The method of claim 12, wherein the additional information comprises information for location capabilities, positioning capabilities, notification capabilities, or a combination thereof, for a user equipment (UE).

16. An apparatus comprising:
means for sending a first message from a mobile station having a first indicator set to indicate additional information to send and not transferable in the first message;
means for receiving a second indicator from a wireless network indicating support of transfer of the additional information; and
means for sending the additional information in a second message in response to receiving the second indicator, wherein the additional information initially informs the wireless network about one or more additional capabilities of the mobile station as operable with the wireless network.

17. The apparatus of claim 16, wherein the means for receiving the second indicator comprises means for receiving a third message requesting for the additional information and serving as the second indicator.

18. An article comprising:
a processor-readable media having stored thereon processor-implementable instructions executable by at least one processor to:

initiate transmission of a first message from a mobile station having a first indicator set to indicate additional information to send and not transferable in the first message;

receive a second indicator from a wireless network indicating support of transfer of the additional information; and initiate transmission of the additional information in a second message in response to receiving the second indicator, wherein the additional information initially informs the wireless network about one or more additional capabilities of the mobile station as operable with the wireless network.

19. The article of claim 18, and further wherein the processor-implementable instructions are executable by the at least one processor to:

receive a third message requesting for the additional information and serving as the second indicator.

20. An apparatus comprising:

a processor at a mobile station to obtain from a wireless network an indication of support of transfer of additional information not transferable in a first information element, and initiate transmission of the additional information in a second information element to the wireless network in response to receiving the indication, wherein the additional information initially informs the wireless network about one or more additional capabilities of the mobile station as operable with the wireless network; and a memory coupled to the processor.

21. The apparatus of claim 20, the processor to further initiate transmission of a first message with the first information element to the wireless network, and initiate transmission of a second message with the second information element to the wireless network.

22. The apparatus of claim 20, the processor to further initiate transmission of a message with the second information element to the wireless network, the second information element including information in the first information element and the additional information.

23. The apparatus of claim 20, wherein the first information element is for Mobile Station Classmark 1, 2 or 3.

24. The apparatus of claim 20, wherein the indication of support of transfer of additional information is received via a broadcast message.

25. The apparatus of claim 20, wherein the indication of support of transfer of additional information is received via a unicast message.

26. The apparatus of claim 20, wherein the additional information comprises new capability information for a user equipment (UE).

27. A method comprising:

receiving at a mobile station from a wireless network an indication of support of transfer of additional information not transferable in a first information element; and transmitting the additional information in a second information element to the wireless network in response to receiving the indication, wherein the additional information initially informs the wireless network about one or more additional capabilities of the mobile station as operable with the wireless network.

28. The method of claim 27, wherein the transmitting the additional information comprises transmitting a first message with the first information element to the wireless network, and transmitting a second message with the second information element to the wireless network.

29. The method of claim 27, wherein the transmitting the additional information comprises transmitting a message with the second information element to the wireless network, the second information element including information in the first information element and the additional information.

30. An apparatus comprising:

means for receiving at a mobile station from a wireless network an indication of support of transfer of additional information not transferable in a first information element; and means for sending the additional information in a second information element to the wireless network in response to receiving the indication, wherein the additional information initially informs the wireless network about one or more additional capabilities of the mobile station as operable with the wireless network.

31. The apparatus of claim 30, wherein the means for sending the additional information comprises means for sending a first message with the first information element to the wireless network, and means for sending a second message with the second information element to the wireless network.

32. The apparatus of claim 30, wherein the means for sending the additional information comprises means for sending a message with the second information element to the wireless network, the second information element including information in the first information element and the additional information.

33. An article comprising:

a processor-readable media having stored thereon processor-implementable instructions executable by at least one processor to:

receive at a mobile station from a wireless network an indication of support of transfer of additional information not transferable in a first information element; and initiate transmission of the additional information in a second information element to the wireless network in response to receiving the indication, wherein the additional information initially informs the wireless network about one or more additional capabilities of the mobile station as operable with the wireless network.

34. The article of claim 33, and further wherein the processor-implementable instructions are executable by the at least one processor to:

initiate transmission of a first message with the first information element to the wireless network, and initiate transmission of a second message with the second information element to the wireless network.

35. The article of claim 33, and further wherein the processor-implementable instructions are executable by the at least one processor to:

initiate transmission of a message with the second information element to the wireless network, the second information element including information in the first information element and the additional information.

* * * * *